(12) United States Patent  
Legner

(10) Patent No.: US 7,287,629 B2  
(45) Date of Patent: Oct. 30, 2007

(54) HYDRODYNAMIC ACTUATING DEVICE FOR CONSTRUCTION MACHINES

(75) Inventor: Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 234 days.

(21) Appl. No.: 10/533,866

(22) PCT Filed: Nov. 8, 2003

(86) PCT No.: PCT/EP03/12478

§ 371 (c)(1), (2), (4) Date: May 5, 2005

(87) PCT Pub. No.: WO2004/046587

PCT Pub. Date: Jun. 3, 2004

(65) Prior Publication Data

US 2006/0016653 A1    Jan. 26, 2006

(30) Foreign Application Priority Data

Nov. 16, 2002 (DE) ............................... 102 53 493

(51) Int. Cl.  
*F16H 61/14* (2006.01)  
*F16H 45/02* (2006.01)

(52) U.S. Cl. ...................... 192/3.26; 192/3.3

(58) Field of Classification Search ............ 192/3.25, 192/3.26, 3.33  
See application file for complete search history.

(56) References Cited

U.S. PATENT DOCUMENTS

| | | | | |
|---|---|---|---|---|
| 3,542,174 A | * | 11/1970 | Hattori | 192/3.26 |
| 4,131,184 A | * | 12/1978 | Rumyantsev et al. | 192/3.26 |
| 4,388,987 A | * | 6/1983 | Hennessey et al. | 192/3.26 |
| 5,400,884 A | | 3/1995 | Matsuoka | |
| 5,947,242 A | | 9/1999 | Creger | |
| 6,505,529 B1 | | 1/2003 | Legner et al. | |

FOREIGN PATENT DOCUMENTS

| | | |
|---|---|---|
| DE | 1 131 107 | 6/1962 |
| DE | 1 226 889 | 4/1967 |
| DE | 42 25 315 A1 | 2/1994 |
| DE | 198 46 955 A1 | 4/2000 |
| DE | 100 21 760 A1 | 11/2001 |
| DE | 100 63 781 A1 | 8/2002 |
| DE | 101 28 076 A1 | 12/2002 |
| EP | 0 308 072 A1 | 3/1989 |
| EP | 0 512 726 A2 | 11/1992 |
| EP | 0 512 708 B1 | 9/1996 |

* cited by examiner

Primary Examiner—Richard M Lorence  
(74) Attorney, Agent, or Firm—Davis Bujold & Daniels, P.L.L.C.

(57) ABSTRACT

A hydrodynamic actuating device has one prime mover, one torque converter and one rear-mounted transmission and is especially adequate for construction machines of wide range of motion such as wheel loaders. For limiting the maximum traction, one primary clutch (16) and one converter bridging clutch (WK) are both coordinated with the torque converter, which are disposed in series so as to be switchable via a single valve controlled by the transmission control with only a control pressure so that in all driving situations, first, the primary clutch (16) and thereafter the converter bridging clutch (WK) are closed.

15 Claims, 1 Drawing Sheet

HYDRODYNAMIC ACTUATING DEVICE FOR CONSTRUCTION MACHINES

This application is a national stage completion of PCT/EP2003/012478 filed Nov. 8, 2003 which claims priority from German Application Serial No. 102 53 493.4 filed Nov. 16, 2002.

FIELD OF THE INVENTION

The invention concerns a hydrodynamic actuating device for construction machines having one prime mover, one torque converter and one rear-mounted transmission, especially for construction machines having wide range of motion, such as mobile cranes, wherein with the torque converter are coordinated one bridging clutch and one primary clutch for limiting the maximum traction.

BACKGROUND OF THE INVENTION

Hydrodynamic actuating devices consisting of one prime mover, one torque converter and one rear-mounted transmission have been used for a long time in a multiplicity of different vehicles; the rear-mounted transmission being mostly designed as reversing power shift transmission in the case of construction machines. In a transmission of this kind, one power shift clutch is respectively provided for the forward gear and for the reverse gear.

One example of a reversing transmission switchable under load which has one hydrodynamic torque converter, one input shaft and one output shaft, one reversing set and gear clutches has been disclosed in the Applicant's DE A 198 46 955. This is a reversing transmission, especially suited for industrial lift trucks but also utilizable as an input assembly of a multi-step reversing transmission so as to be adequate for other construction machines like wheel loaders.

Power shiftable reversing transmissions have a series of advantages. They have compact construction and are comfortable to switch. In addition, the hydraulically actuatable gear clutches can be switched by modulating the switching pressure so that a controlled transfer of load is ensured. In certain construction machines and in fork lift trucks, together with the reversing operation, other conditions are important as starting off, inching and braking, for example.

For construction machines having wide range of motion, such as mobile cranes, one converter bridging clutch is installed in the torque converter and one stator freewheel is coordinated with the torque converter. The converter bridging clutch is designed so that at low traction requirements when no torque conversion is needed, it is closed in order to improve the degree of efficiency of the drive train.

With the hydrodynamic actuating devices described above, the maximum traction cannot be changed, especially not limited, since the traction in the stall point, i.e., when the output is stationary, depends only on the rotational speed of the prime mover. Under full load, the torque converter absorbs the maximum power for the drive system and converts a considerable amount of that in the oil to heat. In order that the hydraulic pump for the working actuating device can produce high conveying capacity, the prime mover has to be kept at high rotational speeds.

To limit the traction of such a hydrodynamic actuating device at high rotational speed of the prime mover, there are two possibilities. One consists in rear-mounting one secondary clutch on the torque converter, such as a directional clutch or providing a primary clutch between prime mover and torque converter (impeller of the torque converter).

For reasons of energy, one primary clutch is to be preferred to a secondary clutch. It has to be taken into consideration here that it is a secondary clutch and not a primary clutch which has to transmit a torque higher by the converter ratio.

A slipping clutch for traction limitation also serves to reduce the power that the torque converter absorbs. In construction machines, it is often necessary to simultaneously actuate the drive system and one oil pump dependent on the prime mover for driving the working hydraulic system and, at the same time, guide the power precisely to where it is needed.

The Applicant has produced so-called ergo-power transmissions with ergo-inch function which have a secondary clutch with which the traction is to be controlled to a small extent by way of a slipping directional clutch.

Power shift clutches, however, are not able to produce high switching capacities for a long time such as those particularly needed for wheel loaders. Therefore, a traction limitation function is ruled out.

A hydrodynamic actuating device with a torque converter in which one primary clutch and one converter bridging clutch are integrated has been proposed by the Caterpillar firm. For the control thereof two control valves are required which are independent of each other. The control electronics needed for their control must accordingly have two analog exits. The clutches integrated in a torque converter are, in addition, affected with the disadvantage that the converter inner pressure fluctuates strongly, can only be measured with difficulties and acts only upon one side of the respective switch piston of the primary clutch or of the converter bridging clutch. Furthermore, the converter inner pressure depends, to a great extent, on the driving rotational speed, the temperature and the characteristic line of the usually provided converter safety valve.

The problem on which the invention is based is to provide a hydrodynamic actuating device for construction machines of wide range of motion, especially a wheel loader, in which the traction at high rotational speed of the prime mover can be easily and reliably limited.

SUMMARY OF THE INVENTION

According to the invention, it is, therefore, provided that the converter bridging clutch and the primary clutch be disposed in series so that they can be switched via a single valve controllable by the transmission control with only one control pressure and this in a manner such that in all driving conditions, first, the primary clutch and thereafter the converter bridging clutch are closed.

The switching in series of both clutches provided, according to the invention, is obtained by correspondingly dimensioning the piston recoil springs and/or by adequate design of the piston surfaces.

It is especially advantageous that the two clutches be located in the interior of the rear-mounted transmission. The advantage attained is that the control of the clutches is entirely independent of the inner pressure predominant in the converter. It is also easily possible to install the two clutches either in parallel or superposed.

BRIEF DESCRIPTION OF THE DRAWINGS

The invention will now be described, by way of example, with reference to the accompanying drawings in which.

DETAILED DESCRIPTION OF THE INVENTION

Figure 1:
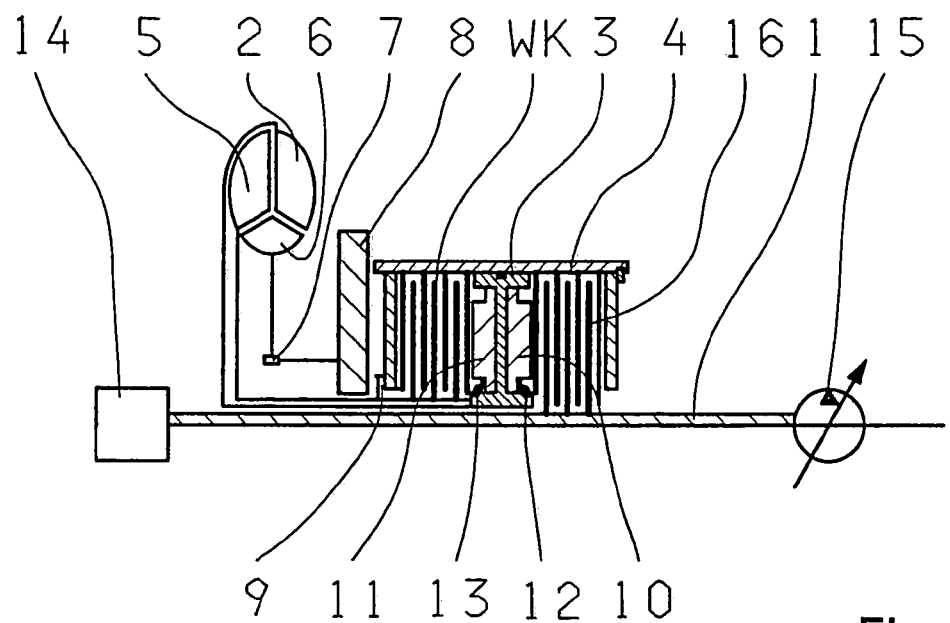
FIG. 1 is a diagrammatic section through the first illustration of an inventive hydrodynamic actuating device.

In the schematically shown hydrodynamic actuating device of FIG. 1, the prime mover 14 of a motor vehicle on which one torque converter having an impeller 2 is rear-mounted, the turbine 5 and the stator 6 and one freewheel 7 being coordinated with the stator.

On the torque converter is rear-mounted one transmission, the housing 8 and the input shaft 1. This transmission is advantageously a reversing power shift transmission known per se and well known to the expert and is not described in detail here. This transmission, which is usually provided with one power shift clutch for the forward gear and the reverse gear, is preferably used in construction machines.

To make possible using the hydrodynamic actuating device also in construction machines having wide range of motion, especially in mobile cranes, with the torque converter is coordinated one bridging clutch WK which under low traction requirements when a torque conversion is not needed, is closed in order thereby to improve the efficiency of the drive train.

If the converter bridging clutch WK, as is usual in hydrodynamic actuating devices for construction machines known from the prior art, is installed in the torque converter, a limitation of the maximum traction to a value below 100% is not possible. In the stall point, that is, when the output is stationary, the traction is dependent only on the rotational speed of the prime mover. In case of full load, the maximum drive capacity is inserted in the torque converter and in the oil converted to heat. In order that the working hydraulic pump 15 can produce high conveying capacity, the prime mover 14 must operate at a high rotational speed.

According to the invention, to now limit the traction at high rotational speed of the engine, one primary clutch 16 is provided which, together with the converter bridging clutch WK, is switched with only one control pressure. In this case, only one control valve is required and also only one analog exit to the appertaining control electronic system is to be provided. The driving conditions are always such that, first, the primary clutch 16 and thereafter the converter bridging clutch WK is closed.

Figure 2:
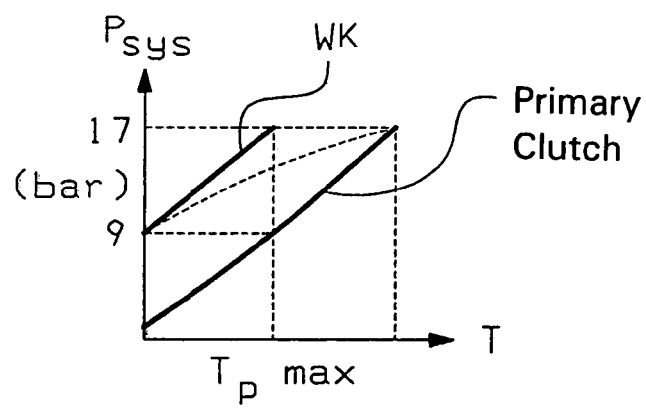
FIG. 2 is a diagram to make clear the switching in series of the two clutches.

To this end, the piston 10 of the primary clutch 16 and the piston 11 of the converter bridging clutch WK are designed so that as the control pressure $P_{sys}$ increases, the primary clutch 16 first transmits torque while the converter bridging clutch WK is still open. When the control pressure further increases, after the primary clutch 16 the converter bridging clutch WK also closes and transmits torque. This switching in series of both clutches which is obtained by adequate dimensioning of the recoil spring 12 for the piston 10 of the primary clutch 16 and the recoil spring 13 for the piston 11 of the converter bridging clutch WK combine with the respective piston surfaces is shown in FIG. 2 by the function T=f(P). In the embodiment chosen after applying the control pressure $P_{sys}$ the primary clutch 16 is first closed and, upon reaching a higher control pressure of 9 bar, the converter bridging clutch WK is closed.

Figure 3:
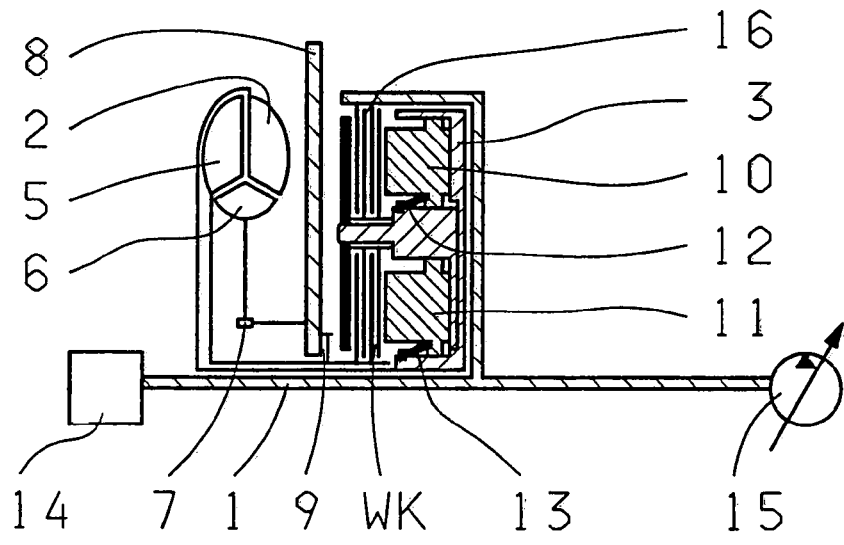
FIG. 3 is a second illustration of an inventive hydrodynamic actuating device.

It is of special advantage when, as shown in FIGS. 1 and 3, the two clutches are displaced into the interior of the rear-mounted transmission, since thereby the control of the clutches is independent of the inner pressure and the changes that prevail in the converter.

In the embodiment shown in FIG. 1, the primary clutch 16 and the converter bridging clutch WK are disposed in parallel in the interior of the housing 8. The piston carrier 3 is connected with the impeller 2 of the torque converter, the disc carrier is 4 connected with the piston carrier 3 and one output gear 9 connected with the turbine wheel 5, which makes a further power flow possible to the stepped transmission that follows.

In the embodiment shown in FIG. 3, where the same parts are provided with the same reference numerals, the two clutches are disposed not in parallel but superposed.

In the primary clutch 16, according to the invention, the inner discs are connected with the input shaft 1 and the outer discs with the impeller 2. Between the two clutch pistons 10, 11 lies the pressurized oil supply. The pressurized oil is fed to the piston space via a central aperture (not shown), in the input shaft 1 and, via piston rings (not shown) between input shaft 1 and the impeller shaft.

REFERENCE NUMERALS 1 input shaft
2 impeller torque converter
3 piston carrier
4 disc carrier
5 turbine wheel
6 stator
7 freewheel
8 housing
9 output wheel
10 piston of primary clutch 16
11 piston of converter bridging clutch WK
12 recoil spring for pistons of the primary clutch 16
13 recoil spring for pistons of WK
14 prime mover
15 pump drive for hydraulic system
16 primary clutch
WK converter bridging clutch

The invention claimed is:

1. A hydrodynamic actuating device having one primary mover, one torque converter and one rear-mounted transmission, for construction machines having a wide range of motion, one bridging clutch (WK) and one primary clutch (16) are coordinated with the torque converter for limiting maximum traction, the primary clutch (16) and the converter bridging clutch (WK) are disposed in series so as to be switchable with only one control pressure so that in all driving situations first the primary clutch (16) and thereafter the converter bridging clutch (WK) are closed; and
    wherein inner discs of the primary clutch (16) are connected with an input shaft (1) and outer discs of the primary clutch (16) are connected with an impeller (2) of the torque converter.

2. The hydrodynamic actuating device according to claim 1, wherein the switching in series of the primary clutch (16) and of the converter bridging clutch (WK) is produced by adequately dimensioning piston recoil springs (12, 13) and by adequate design of surfaces of pistons (10,11).

3. The hydrodynamic actuating device according to claim 1, wherein the torque converter is connected with the rear-mounted transmission via one stator freewheel (7).

4. The hydrodynamic actuating device according to claim 1, wherein both the primary clutch (16) and the converter bridging clutch (WK) are located in an interior of the rear-mounted transmission.

5. The hydrodynamic actuating device according to claim 4, wherein the primary clutch (16) and the converter bridging clutch (WK) are disposed in parallel.

6. The hydrodynamic actuating device according to claim 4, wherein the primary clutch (16) and the converter bridging clutch (WK) are disposed superposed.

7. The hydrodynamic actuating device according to claim 1, wherein inner discs of the converter bridging clutch (WK) are connected with a turbine wheel (5) of the torque converter and outer discs are connected with an impeller (2) of the torque converter.

8. A hydrodynamic actuating device for construction machines having a wide range of motion comprising:
   one primary mover, one torque converter and one rear-mounted transmission;
   one bridging clutch (WK) situated between a pump and a turbine of the one torque converter, and one primary clutch (16) situated between the input shaft and the one torque converter to control the torque converter for limiting maximum traction; and
   wherein the primary clutch (16) and the converter bridging clutch (WK) are disposed in series so as to be switchable with only one control pressure so that in all driving situations first the primary clutch (16) and thereafter the converter bridging clutch (WK) are closed.

9. The hydrodynamic actuating device according to claim 8, wherein the switching in series of the primary clutch (16) and of the converter bridging clutch (WK) is produced by adequately dimensioning piston recoil springs (12,13) and by adequate design of surfaces of pistons (10,11).

10. The hydrodynamic actuating device according to claim 8, wherein the torque converter is connected with the rear-mounted transmission via one stator freewheel (7).

11. The hydrodynamic actuating device according to claim 8, wherein both the primary clutch (16) and the converter bridging clutch (WK) are located in an interior of the rear-mounted transmission.

12. The hydrodynamic actuating device according to claim 11, wherein the primary clutch (16) and the converter bridging clutch (WK) are disposed in parallel.

13. The hydrodynamic actuating device according to claim 11, wherein the primary clutch (16) and the converter bridging clutch (WK) are disposed superposed.

14. The hydrodynamic actuating device according to claim 8, wherein inner discs of the primary clutch (16) are connected with an input shaft (1) and outer discs of the primary clutch (16) are connected with an impeller (2) of the torque converter.

15. The hydrodynamic actuating device according to claim 8, wherein inner discs of the converter bridging clutch (WK) are connected with a turbine wheel (5) of the torque converter and outer discs are connected with an impeller (2) of the torque converter.

* * * * *